United States Patent [19]

Wedemeyer et al.

[11] 4,193,937
[45] Mar. 18, 1980

[54] PROCESS FOR PREPARING 3-CHLORO- AND 3,5-DICHLORO-ANILINES

[75] Inventors: Karlfried Wedemeyer, Cologne; Wolfgang Kiel, Schildgen; Werner Evertz, Monheim, all of Fed. Rep. of Germany

[73] Assignee: Bayer Aktiengesellschaft, Leverkusen, Fed. Rep. of Germany

[21] Appl. No.: 942,711

[22] Filed: Sep. 15, 1978

Related U.S. Application Data

[63] Continuation of Ser. No. 647,966, Jan. 9, 1976, abandoned.

[30] Foreign Application Priority Data

Jan. 27, 1975 [DE] Fed. Rep. of Germany ....... 2503145

[51] Int. Cl.$^2$ .................... C07C 87/52; C07C 87/60; C07C 93/00; C07C 93/08
[52] U.S. Cl. .......................... 260/570 R; 260/570 D; 260/571; 260/575; 260/578
[58] Field of Search ........... 260/578, 571, 575, 570 R, 260/570 D

[56] References Cited

U.S. PATENT DOCUMENTS 3,912,783  10/1975  Wedemeyer et al. .............. 260/620

OTHER PUBLICATIONS

Augustine, "Catalytic Hydrogenation", pp. 125 & 128 (1965).
Handbook of Chemistry and Physics, 52nd Edition, pp. F-183 & F-186 (1971–1972).

*Primary Examiner*—John Doll
*Attorney, Agent, or Firm*—Sprung, Felfe, Horn, Lynch & Kramer

[57] ABSTRACT

Analines, meta-substituted by chlorine are prepared by reacting chloro-anilines having the formula

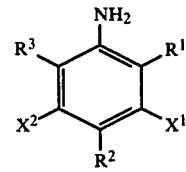

wherein
$X^1$ and $X^2$ are the same or different and represent chlorine, hydrogen or optionally substituted alkyl, aryl, aralkyl, alkoxy or aralkoxy, with one of the radicals $X^1$ or $X^2$ representing chlorine when 3-chloroanilines are being prepared and
$X^1$ and $X^2$ representing chlorine when 3,5-dichloroanilines are being prepared and
$R^1$, $R^2$ and $R^3$ are the same or different and represent chlorine, hydrogen or optionally substituted alkyl, aryl, aralkyl, alkoxy or aralkoxy, with at least one of the radicals $R^1$, $R^2$ or $R^3$ representing chlorine with hydrogen in solution in a neutral or acid medium in the presence of noble metals which are in the elementary form or in the form of compounds and are optionally applied to supports, and in the presence of sulfur or sulfur compounds at elevated temperatures and under pressure.

24 Claims, No Drawings

PROCESS FOR PREPARING 3-CHLORO- AND 3,5-DICHLORO-ANILINES

This is a continuation of application Ser. No. 647,966, filed Jan. 9, 1976, now abandoned.

BACKGROUND

This invention relates to a process for the preparation of anilines meta-substituted by chlorine, by selective dehalogenation or more highly halogenated anilines.

It is known to prepare meta-substituted chloroanilines by catalytic hydrogenation of polychloroanilines in the gas phase (German Published Specification No. 2,258,769). The polychloroanilines are dehalogenated in a tubular reactor, for example over a copper-(II) chloride/aluminium oxide catalyst, at temperatures above 300° C. In the case of the dehalogenation described above, it is always mixtures which are isolated, and these predominantly consist of the starting compound and of compounds which have only been dehalogenated incompletely in the ortho- and para-position. Anilines substituted only in the meta-position by chlorine are only produced in low yields.

SUMMARY

It has been found that anilines which are meta-substituted by chlorine can be prepared when chloroanilines of the formula

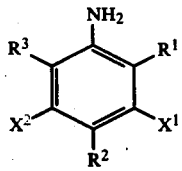

(I)

wherein
X$^1$ and X$^2$ are identical or different and represent chlorine, hydrogen or an optionally substituted alkyl, aryl, aralkyl, alkoxy or aralkoxy radical, with one of the radicals X$^1$ or X$^2$ representing chlorine when 3-chloroanilines are being prepared and X$^1$ and X$^2$ representing chlorine when 3,5-dichloroanilines are being prepared and
R$^1$, R$^2$ and R$^3$ are identical or different and represent chlorine, hydrogen or an optionally substituted alkyl, aryl, aralkyl, alkoxy or aralkoxy radical, with at least one of the radicals R$^1$, R$^2$ or R$^3$ representing chlorine, are reacted with hydrogen in solution in a neutral or acid medium in the presence of noble metals which are in the elementary form or in the form of compounds and are optionally applied to supports, and in the presence of sulphur or sulphur compounds at elevated temperature and under pressure.

Using the process according to the invention, meta-substituted anilines of the formula

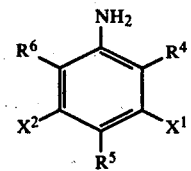

(II)

wherein
X$^1$ and X$^2$ have the abovementioned meaning and R$^4$, R$^5$ and R$^6$ are identical or different and represent hydrogen or an optionally substituted alkyl, aryl, aralkyl, alkoxy or aralkoxy radical are generally obtained.

DESCRIPTION

Optionally substituted aliphatic hydrocarbon radicals (R$^1$, R$^2$, R$^3$, R$^4$, R$^5$ and R$^6$) can be, for example, straight-chain or branched aliphatic hydrocarbon radicals with 1 to 12, preferably with 1 to 6, carbon atoms, and cycloaliphatic hydrocarbon radicals with 5 to 8, preferably 5 and 6, carbon atoms in the ring. The methyl, ethyl, propyl, isopropyl, butyl, pentyl, hexyl, octyl, nonyl, decyl, dodecyl, cyclopentyl, cyclohexyl, cycloheptyl and cyclooctyl radical may be mentioned as examples.

Optionally substituted aromatic radicals R$^1$, R$^2$, R$^3$, R$^4$, R$^5$ and R$^6$ can denote radicals from the benzene series, preferably the phenyl radical or the naphthyl radical.

Optionally substituted aralkyl radicals R$^1$, R$^2$, R$^3$, R$^4$, R$^5$ and R$^6$ can be, for example, radicals with 7 to 18 carbon atoms, of which the alkyl part contains 1 to 6 carbon atoms, preferably 1 to 3 carbon atoms, and of which the aromatic part represents a radical of the benzene series, preferably the phenyl or naphthyl radical. The following aralkyl radicals may be mentioned as examples: the benzyl, m-ethylphenyl, γ-propylphenyl, β-phenyl-n-hexyl, β-[naphthyl-(1)]-ethyl, ω-butylphenyl, ω-pentylphenyl and ω-hexylphenyl radical.

Optionally substituted alkoxy radicals R$^1$, R$^2$, R$^3$, R$^4$, R$^5$ and R$^6$ can be either straight-chain and branched radicals with 1 to 12, preferably with 1 to 6, carbon atoms, or cycloalkyl radicals with 5 and 6 carbon atoms in the ring. The methoxy, ethoxy, propoxy, isopropoxy, butoxy, tert.-butoxy, pentoxy, hexoxy, octoxy, nonoxy, decoxy, dodecoxy, cyclopentoxy, and cyclohexoxy radical may be mentioned as examples.

Radicals of the benzene series, preferably the phenoxy radical, may be mentioned as optionally substituted aryloxy radicals R$^1$, R$^2$, R$^3$, R$^4$, R$^5$ and R$^6$.

Possible substituents of the abovementioned alkyl, aryl, aralkyl, alkoxy or aralkoxy radicals are, for example, the amino group, the hydroxyl group, straight-chain or branched alkyl radicals with up to 12, preferably with up to 6, carbon atoms, cycloalkyl radicals, preferably with 5 and 6 carbon atoms in the ring, and aryl radicals, preferably the phenyl radical.

Particularly preferred chloroanilines which can be employed for the process according to the invention are compounds of the formula

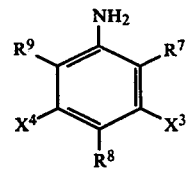

(III)

wherein
X$^3$ and X$^4$ are identical or different and represent chlorine or hydrogen, with one of the radicals X$^3$ or X$^4$ representing chlorine when 3-chloroanilines are being prepared and X$^3$ and X$^4$ representing chlorine when 3,5-dichloroanilines are being prepared, and R⁷, R⁸ and R⁹ are identical or different and represent chlorine, hydrogen, the methyl or phenyl group or the radical

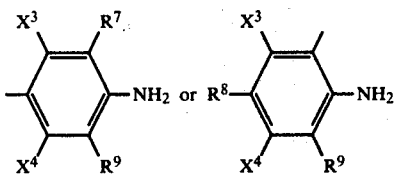

with at least one of the radicals R⁷, R⁸ or R⁹ representing chlorine.

The polychloroanilines of the formula I which can be used for the process according to the invention are known and easily accessible.

Examples which may be mentioned are 2,3-dichloroaniline, 2,5-dichloroaniline, 3,4-dichloroaniline, 2,3,4-trichloroaniline, 2,3,5-trichloroaniline, 2,4,5-trichloroaniline, 2,3,6-trichloroaniline, 3,4,5-trichloroaniline, 2,3,4,6-tetrachloroaniline, 2,3,4,5-tetrachloroaniline, 2,3,5,6-tetrachloroaniline, pentachloroaniline, 4,5,6-trichloro-2-methylaniline, 2,5-dichloro-4-methylaniline, 2,3,5,6-tetrachloro-4-methylaniline, 2,5-dichloro-3,4-dimethylaniline, 2,5-dichloro-4-ethylaniline, 2,5-dichloro-4-propylaniline, 3,4,6-trichloro-2-benzylaniline, 2,2'-diamino-3,5,6,3',5',6'-hexachlorodiphenylmethane, 3,4,5-trichloro-2-aminodiphenyl, 4,4'-diaminooctachlorodiphenyl, 3,4-dichloro-2-methoxyaniline, 3,6-dichloro-2-methoxyaniline, 4,5-dichloro-2-methoxyaniline, 5,6-dichloro-2-methoxyaniline, 3,4,6-trichloro-2-methoxyaniline, 3,4,5-trichloro-2-methoxyaniline, 3,4,5,6-tetrachloro-2-methoxyaniline, 4,5-dichloro-3-methoxyaniline, 5,6-dichloro-3-methoxyaniline, 2,5-dichloro-3-methoxyaniline, 4,5,6-trichloro-3-methoxyaniline, 2,4,5,6-tetrachloro-3-methoxyaniline, 2,3-dichloro-4-methoxyaniline, 2,5-dichloro-4-methoxyaniline, 2,3,6-trichloro-4-methoxyaniline, 2,3,5-trichloro-4-methoxyaniline, 2,3,5,6-tetrachloro-4-methoxyaniline, 4,5-dichloro-2-phenoxyaniline, 3,4,5,6-tetrachloro-2-phenoxyaniline, 2,4,5,6-tetrachloro-3-phenoxyaniline, 2,5-dichloro-4-phenoxyaniline and 2,3,5,6-tetrachloro-4-phenoxyaniline.

The process according to the invention is carried out in the presence of a catalyst of noble metals in the elementary form or in the form of compounds, and of sulphur and/or sulphur compounds.

Noble metals which may be mentioned are the elements of group VIII of the periodic table, such as ruthenium, rhodium, palladium, osmium, iridium and platinum, preferably palladium and platinum. The oxides, sulphides and/or polysulphides are examples of compounds of noble metals which can be employed. For example the follwing oxides, sulphides and/or polysulphides are mentioned: platinum sulphide, platinum disulphide, platinum trisulphide, platinum oxide, platinum dioxide, palladium sulphide, palladium disulphide, palladium oxide, dipalladium trioxide, palladium dioxide, ruthenium disulphide, dirhodium pentasulphide, dirhodium trisulphide, trirhodium tetrasulphide and ennearhodium octasulphide.

Sulphur compounds which can be used are both inorganic and organic sulphur compounds. They can be soluble, sparingly soluble or insoluble in water or in other solvents.

Examples of inorganic sulphur compounds which may be mentioned are monosulphides and polysulphides, thiosulphates and thiocyanates, preferably monosulphides and polysulphides. In general, the cations can be chosen as desired. Examples of inorganic sulphur compounds which may be mentioned are sodium sulphide, sodium polysulphide, potassium sulphide, calcium sulphide, manganese sulphide, iron sulphide, cobalt sulphide, nickel sulphide, copper sulphide, silver sulphide, cadmium sulphide, antimony sulphide, lead sulphide, sodium thiosulphate, potassium thiosulphate, sodium thiocyanate and potassium thiocyanate.

Examples of organic sulphur compounds which may be mentioned are thioalcohol, thiophenols, thioaldehydes, thioketones, thiourea and carbon disulphide, the latter being preferred; of course it is also possible to use the corresponding anions or salts, such as, for example, sodium thioethylate or silver thioethylate.

The ratio of sulphur and/or sulphur compounds to noble metal or noble metal compounds is in general 0.5 to 30, preferably 1 to 15, and especially preferentially 2 to 5, mols of sulphur and/or sulphur compounds per mol of the noble metal or of the noble metal compounds.

The catalysts according to the process of the invention can of course also be used on supports. For this purpose, all supports which are in themselves known can be used, provided they are inert to water and acids. Examples of such supports which may be mentioned are barium sulphate titandioxide, silicagel, aluminiumoxide and active charcoal, preferably active charcoal.

The nobel metal catalyst on a support can be prepared in a manner which is in itself known. For example, the support is suspended in the aqueous solution of the noble metal compound and the noble metal is then precipitated on the support by adding a reducing agent, such as, for example, hydrogen or hydrazine. The sulphur and/or the sulphur compounds can be added together with the chloroaniline employed as the starting material.

Particularly when carrying out the process according to the invention continuously and when working in an aprotic solvent it can be advantageous to arrange the noble metal catalyst and the sulphur and/or the sulphur compounds on a support, as a fixed bed or fluidised bed catalyst in the reaction chamber. For example, in such a case, the sulphur and/or the sulphur compound together with the noble metal or the noble metal compound are applied to the support before use.

An advantageous procedure for this is to suspend the noble metal, optionally applied to a support, or the noble metal compound, in the aqueous solution of a suitable metal salt, from which the sparingly soluble sulphur compounds of the metals can then be precipitated, by introduction of hydrogen sulphide or by addition of water-soluble sulphur compounds, onto the noble metal, optionally applied to a support, or the noble metal compound.

Examples of suitable water-soluble metal salts which may be mentioned are the halides, nitrates, sulphates, oxalates and acetates, preferably the chlorides, nitrates or sulphates, of, for example, manganese, iron, cobalt, nickel, copper, silver, cadmium, antimony or lead, preferably iron and cobalt.

Examples of water-soluble sulphur compounds which can be employed and which are suitable, according to the process of the invention, for precipitating the metal sulphides, are hydrogen sulphide, the sulphides and polysulphides of the alkali metals and organic compounds containing mercapto groups, or their alkali metal salts. Examples of individual compounds which may be mentioned are sodium sulphide, sodium polysulphide, potassium sulphide, potassium polysulphide, thioethanol, thiophenol, thioacetic acid, dithioacetic acid and sodium thioacetate, preferably sodium sulphide and sodium polysulphide.

The catalysts which are employed for carrying out the process according to the invention retain their activity and their selectivity over a long period even if reused repeatedly or if the process according to the invention is carried out continuously, and give constant high yields of meta-chloroanilines.

If a catalyst which has been prepared using volatile and/or soluble sulphur compounds is employed in carrying out the process according to the invention, it is possible and advantageous to add sulphur and/or sulphur compounds afresh when reusing the catalysts in a new batch, or when the process according to the invention is carried out continuously. If the process according to the invention is carried out continuously, the small amounts of sulphur and/or sulphur compounds are added continuously.

The amount of catalyst which is employed for carrying out the process according to the invention is not critical and can be varied within wide limits. In general, 0.1 to 2% by weight, preferably 1 to 1.5% by weight, relative to the chloroaniline used as the starting material, are employed. If a catalyst applied to a support is used, a correspondingly larger amount of supported catalyst is employed; in general, 1 to 20% by weight, preferably 10 to 15% by weight, relative to the starting material, are then employed.

The process according to the invention is carried out in solution. Solvents which can be used are all protic and aprotic solvents which are inert under the reaction conditions.

Examples of protic solvents which may be mentioned are water, methyl alcohol and ethyl alcohol, preferably water.

Examples of aprotic solvents which may be mentioned are benzene, toluene, xylene, cyclohexan, methylcyclo hexan and decaline, preferably toluene. If an aprotic solvent is used the process is preferably carried out under anhydros conditions. In that case it is of course also necessary that the catalyst should be employed dry.

The process according to the invention is carried out in a neutral or acid medium. When working in aqueous solution, the process is generally carried out at a pH value of less than 8, preferably of less than 6.5.

When carrying out the process in a neutral medium (about pH 7), this is done, for example, in the presence of an acid acceptor. Calcium carbonate may be mentioned as an example of an acid acceptor.

When carrying out the process in an acid medium, inorganic and organic acids can be used.

Inorganic mineral acids which should be mentioned are hydrochloric acid, sulphuric acid and phosphoric acid, preferably hydrochloric acid and sulphuric acid, and organic acids which should be mentioned are acetic acid and propionic acid, preferably acetic acid. Particularly for the preparation of 3,5-dichloroanilines it can be advantageous to use a mixture of the abovementioned acids. Preferably, a mixture of hydrochloric acid and sulphuric acid is employed for this purpose.

The amount of acid employed can be varied within wide limits without adversely affecting the outcome of the reaction. In general, it is advantageous to carry out the reactions in 5 to 10% strength aqueous hydrochloric acid, if appropriate with addition of 1 to 10% by weight of concentrated sulphuric acid, relative to the total solvents. It is also advantageous to carry out the reaction in toluene, if appropriate with addition to 0.5 to 10% by weight of concentrated sulphuric acid, relative to the solvent.

The process according to the invention can be illustrated by the following equation for the dechlorination of pentachloroaniline to 3,5-dichloroaniline:

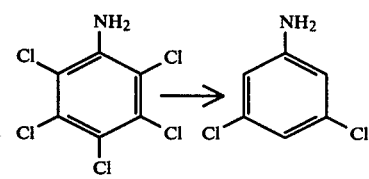

In general, the process is carried out by initially introducing the starting material, solvent, catalyst and, if appropriate, acid into an acid-resistant autoclave and, after sealing the autoclave, displacing the air with nitrogen and then displacing the nitrogen with hydrogen.

To carry out the reaction, the gaseous hydrogen is passed into the reaction mixture. In general, the reaction is carried out at a hydrogen pressure of 20 to 200 atmospheres gauge, preferably of 40 to 150 atmospheres gauge, and particularly preferentially of 60 to 120 atmospheres gauge.

In general, the process according to the invention is carried out at a temperature of 100° to 350° C., preferably of 150° to 300° C. and particularly preferentially of 180° to 270° C.

Since the rate of reaction increases at higher temperature, it is not possible to specify the reaction time in general terms. However, if the time which would be required for a conversion is exceeded, neither the selectivity of the dechlorination nor the yield are adversely affected.

After completion of the reaction the catalyst is filtered off hot if water is used as the solvent. The 3-chloroanilines or 3,5-dichloroanilines are liberated by adding an alkali metal hydroxide, for example sodium hydroxide, and are extracted with a water-immiscible solvent, for example methylene chloride. The chloroanilines can then be obtained from the solvent by, for example, distillation.

If a solvent which is immiscible with water is employed in the reaction, the 3-chloroanilines or 3,5-dichloroanilines can be liberated by adding aqueous alkali metal hydroxides. Thereafter the organic solvent can be separated off and the chloroaniline isolated by, for example, distillation.

The process according to the invention can be carried out either discontinuously or continuously.

The process according to the invention has the advantage that by selective dechlorination of higher chlorinated anilines it is possible to prepare anilines which are meta-substituted by chlorine, in a simple manner and with high yields. Above all the anilines substituted by chlorine in both meta-positions, such as, for example, 3,5-dichloroaniline, can only be synthesised in a very labour-intensive and cost-intensive manner if previously known processes of preparation are used. For example, the previously customary preparation of 3,5-dichloroaniline is via the chlorination of p-nitroaniline to 1-amino-2,6-dichloro-4-nitrobenzene. The amino group is then diazotised and reductively replaced by hydrogen. The resulting 3,5-dichloronitrobenzene is then reduced to 3,5-dichloroaniline (Ber. dtsch. chem. Ges. 8, 143 and 145).

A further advantage of the process according to the invention is that chloroaniline mixtures which can only be separated with difficulty and which contain, in addition to the polychloroanilines substituted in the m-position relative to the amino group by chlorine, further chloroanilines or polychloroanilines in which there is no chlorine in the m-position relative to the amino group, can also be used as the starting material. These compounds are dechlorinated to aniline by the process according to the invention and the aniline can easily be separated off by distillation. In contrast, the separation of a polychloroaniline mixture is involved and lengthy.

The following may be mentioned as examples of chloroanilines of the formula II which are meta-substituted by chlorine and which can be prepared according to the process of the invention: 3-chloroaniline, 3,5-dichloroaniline, 5-chloro-2-methylaniline, 5-chloro-3-methylaniline, 3-chloro-4-methylaniline, 3,5-dichloro-4-methylaniline, 5-chloro-3,4-dimethylaniline, 3-chloro-4-ethylaniline, 3-chloro-2-benzylaniline, 4,4'-diamino-2,6,2',6'-tetrachlorodiphenyl, 3-chloro-2-methoxyaniline, 5-chloro-2-methoxyaniline, 3,5-dichloro-2-methoxyaniline, 3-chloro-4-methoxyaniline, 5-chloro-3-methoxyaniline, 3,5-dichloro-4-methoxyaniline, 3-chloro-2-phenoxyaniline, 5-chloro-2-phenoxyaniline, 3,5-dichloro-2-phenoxyaniline and 3,5-dichloro-4-phenoxyaniline.

The 3-chloroanilines and 3,5-dichloroanilines obtainable according to the process of the invention are known intermediate products and can be used for the preparation of plant protection agents (German Pat. No. 1,034,912, German Published Specification No. 2,021,327, German Published Specification No. 1,812,206, German Published Specification No. 1,958,183 and U.S. Pat. Nos. 2,906,614, 2,655,445 and 3,652,737).

EXAMPLES

A. Preparation of the catalyst

EXAMPLES 1 TO 11

A suspension of 10 g of an active charcoal, containing up to 5% by weight of noble metal, in the solution of a 3- to 6-fold molar amount of a metal salt (relative to 1 mol of the noble metal employed) in 200 ml of water is prepared, and heated to 80° C., in a flask, whilst stirring. A solution of 2 g of $Na_2S . 3 H_2O$ in 30 ml of water is slowly added dropwise to this suspension.

After completion of the addition, the mixture is stirred for a further 30 minutes at 80° C. The catalyst is then filtered off and washed with distilled water until free from sulphide. If the catalyst is to be employed in an aprotic solvent, it is dried for about 12 hours at 80° C. and 250 mm Hg.

A catalyst in which the sparingly soluble sulphide of a metal salt has been precipitated onto the noble metal applied to active charcoal is obtained.

The table which follows gives individual examples of the preparation of the catalyst in accordance with the preceding general instruction; the noble metal is mentioned in column 2 and the amount and nature of the metal salt in column 3.

Table I

| Example No. | Noble metal | Metal salt |
|---|---|---|
| 1 | Pd | 4.2 g $FeSO_4 . 7 H_2O$ |
| 2 | Pd | 8.4 g $FeSO_4 . 7 H_2O$ |
| 3 | Pd | 4.2 g $CoSO_4 . 7 H_2O$ |
| 4 | Pd | 3.6 g $NiCl_2 . 6 H_2O$ |
| 5 | Pd | 3.0 g $MnCl_2 . 4 H_2O$ |
| 6 | Pd | 5.7 g $Pb(CH_2 COO)_2 . 3 H_2O$ |
| 7 | Pd | 2.56 g $AgNO_3$ |
| 8 | Pd | 3 g $CdCl_2 . H_2O$ |
| 9 | Pt | 2.56 g $AgNC_3$ |
| 10 | Ru | 4.2 g $FeSO_4 . 7 H_2O$ |
| 11 | Rh | 4.2 g $FeSO_4 . 7 H_2O$ |

EXAMPLES 12 TO 19

The preparation of catalysts effected by simply bringing together the noble metal and sulphur or sulphur compounds is described in Examples 12 to 19. In each of these cases, 10 g of an active charcoal containing about 5% by weight of noble metal is mixed with the amount of sulphur or sulphur compounds indicated in Table II below.

Table II

| Example No. | Noble metal | Amount and nature of the sulphur compound |
|---|---|---|
| 12 | Pd | 2.6 $Sb_2S_3$ |
| 13 | Pd | 1.0 $Na_2S . 3 H_2O$ |
| 14 | Pd | 1.08 Cas |
| 15 | Pd | 0.5 S |
| 16 | Pd | 1.15 $CS_2$ |
| 17 | Pd | 1.25 NaS . $C_2H_5$ |
| 18 | Pd | 2.53 AgS . $C_2H_5$ |
| 19 | Pt | 1.0 $Na_2S . 3 H_2O$ |

B. Examples of the dehalogenation of the chloroanilines

General procedure I

Water as the solvent, polychloroaniline, catalyst and, if appropriate, an acid, are initially introduced into an autoclave made of tantalum. The autoclave is flushed first with nitrogen and then with hydrogen. After carrying out the hydrogenation, the catalyst is separated from the reaction mixture by filtration and is twice washed with hot water. The reaction solution, together with the wash water, is rendered alkaline and warmed. After cooling, the reaction product is twice extracted with methylene chloride. After distilling off the methylene chloride and subsequent fractional distillation, the corresponding 3-chloroaniline or 3,5-dichloroaniline is obtained.

General procedure II

The polychloroaniline, the catalyst, toluene as the solvent and, if appropriate, an acid are introduced into an autoclave made of tantalum. The autoclave is flushed first with nitrogen and then with hydrogen. After having carried out the dechlorination, hot water is added to the reaction mixture and the whole is warmed. The catalyst is separated off by filtration and washed twice with hot water. The reaction solution together with the wash water is rendered alkaline and warmed. After cooling, the toluene phase is separated off and the aqueous phase is extracted twice more with toluene. After distilling off the toluene, and subsequent fractional distillation, the 3-chloroaniline or 3,5-dichloroaniline is obtained.

EXAMPLES 20 TO 24

The hydrogenation of 2,5-dichloroaniline to 3-chloroaniline is described in Examples 20 to 24. General procedure I and II are followed. The reaction conditions and yields are shown in Table V below.

EXAMPLE 25

Following general procedure I, 40.5 g (0.25 mol) of 2,5-dichloroaniline are hydrogenated in 250 ml of water, in the presence of the catalyst from Example 1 and without addition of acid, for 30 minutes at 220° C. under a $H_2$ pressure of 100 atmospheres gauge. 28 g of crude product of the following composition are obtained:
3-Chloroaniline: 68.8%;
2,5-Dichloroaniline: 29.0%.

EXAMPLE 26

Example 26 shows that the catalyst can be employed repeatedly for a dechlorination reaction without loss in yield of meta-chloroaniline.

Using the general procedure I, 40.5 g (0.25 mol) of 2,5-dichloroaniline and 5 g of catalyst according to Example 1, in 200 ml of water and 60 ml of concentrated hydrochloric acid, are hydrogenated over the course of 30 minutes at a hydrogen pressure of 100 atmospheres gauge. The catalyst is employed for 8 hydrogenation reactions. After each use, 0.01 mol of iron sulphide is added to the catalyst. As is shown by Table III, the yield remains approximately the same after the catalyst has been used 8 times.

Table
Repeated use of a palladium/active charcoal/iron sulphide catalyst for the hydrogenation of 2,5-dichloraniline

| Use No. | 1 | 2 | 3 | 4 | 5 | 6 | 7 | 8 |
|---|---|---|---|---|---|---|---|---|
| Yield | 95 | 90 | 84 | 94 | 93 | 87 | 88 | 95 |
| Purity | 98.23 | 95.92 | 99.26 | 98.92 | 98.63 | 98.93 | 98.79 | 98.99 |

EXAMPLE 27

Following the general procedure I, 0.25 mol of 2,4,5-trichloroaniline in 200 ml of water and 60 ml of concentrated hydrochloric acid are hydrogenated in the presence of the catalyst from Example 1 at 220° C. over the course of 60 minutes under a hydrogen pressure of 100 atmospheres gauge. 3-Chloroaniline is obtained in a yield of 84.1% and a purity of 99%.

EXAMPLE 28

Following the general procedure I, 0.25 mol of 4,5-dichloro-2-methylaniline in 200 ml of water and 60 ml of concentrated hydrochloric acid are hydrogenated in the presence of the catalyst from Example 1 at 220° C. over the course of 30 minutes under a hydrogen pressure of 100 atmospheres gauge. 5-Chloro-2-methylaniline is obtained in a yield of 82% and a purity of 99%.

EXAMPLE 29

Following the general procedure I, 0.25 mol of 4,5-dichloro-2-methoxyaniline in 200 ml of water and 60 ml of concentrated hydrochloric acid are hydrogenated in the presence of the catalyst from Example 1 at 180° C. over the course of 45 minutes under a hydrogen pressure of 100 atmospheres gauge. 5-Chloro-2-methoxyaniline is obtained in a yield of 40% and a purity of 74%.

Table V
(Accompanying Examples 23 to 27)
Hydrogenation of 2,5-dichloroaniline to 3-chloroaniline

| Example No. | Amount of 2,5-dichloro-aniline employed | Process according to general procedure | Reaction temperature Reaction time Hydrogen pressure | Solvent amount of acid catalyst | Yield % | Purity % |
|---|---|---|---|---|---|---|
| 20 | 40 g | I | 220° 30 mins. 100 atms. | 200 ml of $H_2O$, 60 ml of conc HCl, 5 g of catalyst according to Example 1 | 95% | 98.23 |
| 21 | 40 g | I | 220° 30 mins. 100 atms. | 200 ml of $H_2O$, 60 ml of conc, HCl, 5 g of palladium/active charcoal (5% strength by weight), 6 g of carbon disulphide | 70% | 89.25 |
| 22 | 40 g | I | 280° 60 mins. 100 atms. | 250 ml of glacial acetic acid, 5 g of catalyst according to Example 1 | 77% | 79.43 |
| 23 | 40 g | II | 260° 60 mins. 200 atms. | 250 ml of toluene, 4 ml of $H_2SO_4$, 5 g of catalyst according to Example 1 | 72% | 81.0 |
| 24 | 40 g | II | 260° 90 mins. 200 atms. | 250 ml of toluene, 5 g of catalyst according to Example 2 | 77.5% | 78.89 |

EXAMPLE 30

Following the general procedure I, 0.25 mol of 2,5,2',5'-tetrachloro-4,4'-diamino-diphenyl in 200 ml of water and 60 ml of concentrated hydrochloric acid are hydrogenated in the presence of the catalyst from Example 1 at 250° C. over the course of 30 minutes under a hydrogen pressure of 100 atmospheres gauge. 2,2'-Dichloro-4,4'-diaminodiphenyl is obtained in a yield of 84.5% and a purity of 99%.

EXAMPLE 31

65 g (0.4 mol) of 2,5-dichloroaniline in 250 ml of water, 20 g of calcium carbonate, the catalyst from Example 1 and 5 g of carbon disulphide are introduced into an autoclave. The hydrogenation is carried out at 260° C. under a hydrogen pressure of 200 atmospheres gauge over the course of 150 minutes. During the hydrogenation, the reaction mixture has a pH value of about 6.

The mixture is worked up according to general procedure I. 52 g of product of the following composition are obtained:

Aniline: 0.78%;
3-Chloroaniline: 68.27%;
2,5-Dichloroaniline: 30.94%.

The yield of 3-chloroaniline is 70% of theory.

EXAMPLE 32

Following general procedure II, 20 g of 2,3,5,6-tetrachloroaniline in 150 ml of toluene and 6 ml of concentrated sulphuric acid are hydrogenated in the presence of the catalyst from Example 1 at 240° C. over the course of 60 minutes under a hydrogen pressure of 200 atmospheres gauge. 14.5 g of crude product containing 58.2% of 3,5-dichloroaniline are obtained. The remaining constituents are predominantly still trichloroaniline and starting material.

EXAMPLE 33

(Comparison example, catalyst without sulphur)

40.5 g of 2,5-dichloroaniline, 250 ml of water and 5 g of a 5% strength palladium/active charcoal catalyst are initially introduced into an 0.7 l autoclave made of tantalum. The autoclave is flushed first with nitrogen then with hydrogen. The hydrogenation is carried out over the course of 30 minutes at a hydrogen pressure of 200 atmospheres gauge and a temperature of 220° C. After the reaction, the catalyst is separated off by filtration and washed twice with hot water. The reaction solution, together with the wash water, is rendered alkaline and warmed. After cooling, the reaction product is extracted with 200 ml of methylene chloride. After distilling off the methylene chloride, 23.7 g of aniline (yield 99% of theory, purity 97%) are obtained.

What is claimed is:

1. Process for preparing anilines meta-substituted by chlorine which comprises reacting chloroanilines having the formula

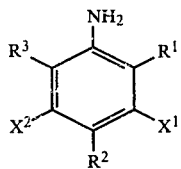

wherein
$X^1$ and $X^2$ are the same or different and represent chlorine, hydrogen or optionally substituted alkyl, aryl, aralkyl, alkoxy or aralkoxy, with one of the radicals $X^1$ or $X^2$ representing chlorine when 3-chloroanilines are being prepared and
$X^1$ and $X^2$ representing chlorine when 3,5-dichloroanilines are being prepared and
$R^1$, $R^2$ and $R^3$ are the same or different and represent chlorine, hydrogen or optionally substituted alkyl, aryl, aralkyl, alkoxy or aralkoxy, with at least one of the radicals $R^1$, $R^2$ or $R^3$ representing chlorine,
with hydrogen in solution in an acid medium in the presence of noble metals which are in the elementary form or in the form of compounds and are optionally applied to supports, and in the presence of sulfur or sulfur compounds at elevated temperatures and under pressure, said chloroaniline being introduced into a reaction vessel and the pH of the contents thereof being adjusted to less than 6.5 before addition of hydrogen.

2. Process of claim 1 carried out at temperatures of from 150° to 350° C.

3. Process of claim 1 carried out at temperatures of from 180° to 270° C.

4. Process of claim 1 carried out at a hydrogen pressure of from 20 to 200 atmospheres gauge.

5. Process of claim 1 carried out at a hydrogen pressure of from 60 to 120 atmospheres gauge.

6. Process of claim 1 wherein the chloroanilines have the formula

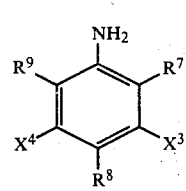

wherein
$X^3$ and $X^4$ are the same or different and represent chlorine or hydrogen, with one of the radicals $X^3$ or $X^4$ representing chlorine when 3-chloroanilines are being prepared and $X^3$ and $X^4$ representing chlorine when 3,5-dichloroanilines are being prepared, and
$R^7$, $R^8$ and $R^9$ are the same or different and represent chlorine, hydrogen, the methyl or phenyl group or the radicals

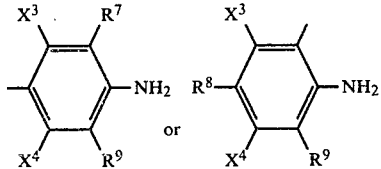

with at least one of the radicals $R^7$, $R^8$ or $R^9$ representing chlorine.

7. Process of claim 1 wherein the noble metals used are elements of group VIII of the periodic table, in the elementary form or as oxides or sulfides.

8. Process of claim 1 wherein palladium or platinum are used as the noble metal.

9. Process of claim 1 wherein the noble metals are used on a support of active charcoal.

10. Process of claim 1 wherein the reaction is carried out in the presence of elementary sulfur.

11. Process of claim 1 wherein the reaction is carried out in the presence of inorganic sulfur compounds.

12. Process of claim 1 wherein the reaction is carried out in the presence of monosulfides or polysulfides.

13. Process of claim 1 wherein the reaction is carried out in the presence of organic sulfur compounds.

14. Process of claim 1 wherein the reaction is carried out in the presence of carbon disulfide.

15. Process of claim 1 wherein the catalyst is prepared by suspending the noble metal applied to a support, or the noble metal compound, in the aqueous solution of a metal salt and precipitating the sparingly water-soluble metal sulfide onto the noble metal applied to a support, or the noble metal compound, by adding a water-soluble sulfide compound.

16. Process of claim 1 wherein the catalyst is prepared by suspending the noble metal applied to a support, or the noble metal compound, in the aqueous solution of a metal salt and precipitating the sparingly water-soluble metal polysulfide onto the noble metal applied to a support, or the noble metal compound, by adding a water-soluble polysulfide compound.

17. A process according to claim 1 wherein the pH is adjusted by introducing therein an inorganic or organic acid.

18. A process according to claim 17 wherein the acid is an inorganic acid.

19. A process according ro claim 18 wherein the inorganic acid is hydrochloric, sulfuric or phosphoric acid.

20. A process according to claim 17 wherein said acid is an organic acid.

21. A process according to claim 20 wherein the organic acid is acetic or propionic acid.

22. Process for preparing anilines meta-substituted by chlorine which comprises reacting chloroanilines having the formula

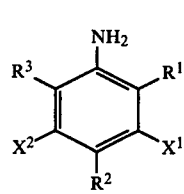

wherein
$X^1$ and $X^2$ are the same or different and represent chlorine, hydrogen or optionally substituted alkyl, aryl, aralkyl, alkoxy or aralkoxy, with one of the radicals $X^1$ or $X^2$ representing chlorine when 3-chloroanilines are being prepared and
$X^1$ and $X^2$ representing chlorine when 3,5-dichloroanilines are being prepared and
$R^1$, $R^2$ and $R^3$ are the same or different and represent chlorine, hydrogen or optionally substituted alkyl, aryl, aralkyl, alkoxy or aralkoxy, with at least one of the radicals $R^1$, $R^2$ or $R^3$ representing chlorine, with hydrogen in solution in a neutral or acid medium in the presence of noble metals which are in the elementary form or in the form of compounds and are optionally applied to supports, and in the presence of sulfur or sulfur compounds at elevated temperatures and under pressure, the hydrogen being introduced into a reaction vessel containing the chloroaniline and as the acid of the acid medium an organic acid, sulfuric acid or phosphoric acid.

23. A process according to claim 22 wherein the acid is an organic acid.

24. A process according to claim 22 wherein the inorganic acid is sulfuric or phosphoric.

* * * * *